United States Patent [19]

Sacco

[11] Patent Number: 4,945,992
[45] Date of Patent: Aug. 7, 1990

[54] PROCESS FOR PRODUCING OR CLEANING HIGH PRESSURE WATER INJECTION WELLS

[76] Inventor: Frank J. Sacco, 26582 El Mar Dr., Mission Viejo, Calif. 92691

[21] Appl. No.: 366,246

[22] Filed: Jun. 12, 1989

Related U.S. Application Data

[63] Continuation of Ser. No. 78,744, Jul. 28, 1987, abandoned, which is a continuation of Ser. No. 944,794, Dec. 22, 1986, Pat. No. 4,823,826.

[51] Int. Cl.$^5$ ............................................. E21B 37/06
[52] U.S. Cl. .................................. 166/310; 166/312; 422/37
[58] Field of Search ............................ 166/310–312, 166/279; 210/754–758; 423/478, 477; 252/8.3, 8.552; 422/37

[56] References Cited

U.S. PATENT DOCUMENTS

| | | | |
|---|---|---|---|
| 2,871,097 | 1/1959 | Rapson | 23/152 |
| 3,082,146 | 3/1963 | Wentworth et al. | 167/17 |
| 3,122,503 | 2/1964 | Katzer | 166/312 X |
| 3,123,521 | 3/1964 | Wentworth et al. | 167/17 |
| 3,529,666 | 9/1970 | Crowe | 166/312 X |
| 4,077,879 | 3/1978 | Smeck | 210/754 |
| 4,310,425 | 1/1982 | Key et al. | 252/8.5 A |
| 4,384,961 | 5/1983 | Abrams et al. | 166/267 X |
| 4,473,115 | 9/1984 | Oakes, deceased | 166/250 |
| 4,534,952 | 8/1985 | Rapson et al. | 210/754 X |
| 4,588,506 | 5/1986 | Raymond et al. | 166/246 X |

FOREIGN PATENT DOCUMENTS

1207269 7/1986 Canada .
2170220 11/1987 United Kingdom .

OTHER PUBLICATIONS

*Chlorine Dioxide Chemistry and Environmental Impact of Oxychlorine Compounds,* W. J. Masschelein and Rip G. Rice, Ann Arbor Science Publishers, Inc. (1979).
*A Primer of Oilwell Drilling,* Ron Baker, Petroleum Extension Service (1979).
*Introduction of Oil & Gas Production,* American Petroleum Institute (1983).

*Primary Examiner*—Bruce M. Kisliuk

[57] ABSTRACT

A process for controlling biomass and cleaning water injection wells and oil producing wells by injecting an oxidant into the pumped water injection stream. Chlorine dioxide or sodium chlorite, depending on the reactants present in the well, may be injected by means of a stinger, a spool or a coiled tube into the pumped water injection stream. Chlorine dioxide is generated at the site and may be generated by any one of several known processes. Hydrochloric acid or other proton donor stream, a water stream, and a stream containing sodium chlorate, sodium chlorite, and optional sodium chloride may be mixed at an elevated pressure to create chlorine dioxide. The elevated pressure of the chlorine dioxide stream is maintained at or boosted to a level greater than the pressure of the water injection or oil-producing well to aid in the injection of the chlorine dioxide stream either from generation to the well or through a booster pump mechanism to the well. Elevated pressure is maintained during application at a level to maintain the chlorine dioxide in solution.

32 Claims, 2 Drawing Sheets

PROCESS FOR PRODUCING OR CLEANING HIGH PRESSURE WATER INJECTION WELLS

This application is a continuation of Ser. No. 07/078,744 filed Jul. 28, 1987, now abandoned, which is a continuation-in-part of Ser. No. 06/944,794 filed Dec. 22, 1986, now U.S. Pat. No. 4,823,826.

BACKGROUND OF THE INVENTION

The field of the present invention is treatment of high pressure water injection wells.

The oil industry uses a variety of techniques to maximize the recovery of oil from any particular oil formation. One of the methods so used is the injection of water under high pressure at a point removed from the site of the oil removal. Large amounts of water are injected under high pressure into the oil-producing sands and are removed at the oil well site along with the resident oil. Such methods typically require up to twenty parts water per part oil recovered. Given this large amount of required water, many oil producers utilize the nearest large source of water, which can be a surrounding ocean, nearby bay, or water produced with the oil. Little care is taken to purify the injection water and, therefore, a wide variety of impurities are often injected in the water injection well.

The constant high volume flow of impure water and the warm, incubator-like environment of oil field water treatment systems encourages the uncontrolled growth of biomass—the source of many costly problems. Bacterial growth, if left unchecked, causes: formation of hydrogen sulfide, a toxic and corrosive gas that eats through piping in water and vapor recovery systems; accumulation of gummy biomass that adheres to surfaces and filter media and substantially reduces equipment efficiency; formation of abrasive iron sulfide that wears injection pumps, decreases injectivity, fouls flow lines and causes corrosion; all increasing operating costs and lowering oil production. The resultant build-up at the screen leading from the casing into the oil-producing sands constricts the flow of water through the tubing and screen. As the flow is constricted, less water can be pumped through the system, leading to decreased oil production. If the water injection tubing and screen are not cleaned out periodically, the screen can become entirely obstructed.

A conventional treatment against bacterial growth is to use such substances as glutaraldehyde, acrolein and quaternary amines which are nonoxidizing compounds. They are used to control biomass by altering the permeability of the cell membrane of the microorganisms and interfering with their vital life processes. The application of these products, however, does nothing for the plugging, fouling, deposits and corrosion that have been caused by the biomass and bacterial by-products.

Under the present state of the art, the commonly accepted procedure for cleaning out such water injection casings is to inject hydrochloric acid into the water injection well. The hydrochloric acid, by keeping the pH of the system low, solubilizes some of the unwanted materials so that they can be washed out of the water injection well. This prior art method suffers from several problems. First, such mixtures can be highly corrosive and will corrode the water injection well. In addition, such a mixture has little or no effect on any biomass that may have built up. Such biomass is often the primary obstructor. Finally, this method of clean-out is relatively expensive.

Also relevant as background to the present process is an overview of the compound chlorine dioxide. Chlorine dioxide was discovered in 1814 and has achieved considerable commercial significance in the bleaching of pulp, textiles, flour, etc., water purification, etc. Chlorine dioxide is, under certain conditions, inherently explosive and has necessitated extensive controls on the reaction conditions and on the reaction effluent. In the gaseous state, chlorine dioxide is explosive at concentrations above about ten percent in air. Typically, where large amounts of chlorine dioxide are desired, sodium chlorate or sodium chlorite has been the source material. The sodium chlorate is contacted with chemicals such as sulfur dioxide, oxalic acid, hydrochloric acid, organic reducing agents, etc., under carefully controlled conditions to produce chlorine dioxide containing more or less chlorine depending on the particular conditions employed. For smaller quantities, sodium chlorite has been used to react with chlorine to generate more pure chlorine dioxide. Again, rather extensive safety precautions have been required in the past.

For a good review of the chemistry, physical properties, and uses of chlorine dioxide, see Masschelein, W. J. "Chlorine Dioxide—Chemistry and Environmental Impact of Oxychlorine Compounds", Ann Arbor Science Publishers, Inc. (1979), the disclosure of which is incorporated herein by reference. Given the explosive tendencies of both chlorine dioxide and sodium chlorite, prior art methods of production involved various precautions. For example, U.S. Pat. No. 2,871,097 to Rapson discloses the use of inert gases "in an amount sufficient to maintain the effluent gases non-explosive".

Chlorine dioxide has found its way into limited use in the oil production industry. This material has been recognized for the treatment of oil field produced fluids. Reference is made to Canadian Patent No. 1,207,269, issued July 8, 1986, the disclosure of which is incorporated herein by reference. Reference is also made to Smeck, U.S. Pat. No. 4,077,879, issued Mar. 7, 1978. In these processes, the chlorine dioxide is typically used for surface treatment of oil field produced fluids.

Therefore, there has existed the need for a process to treat water injection or oil-producing wells that will remove biomass as well as other deposits caused thereby and avoid excessive corrosion of the water casing and other parts without creating dangerous operating conditions.

SUMMARY OF THE INVENTION

The present invention is directed to a process for removing or controlling the build-up of deposits in a water injection or oil-producing well for enhanced oil recovery and the apparatus therefor. Chlorine dioxide is manufactured and then injected under high pressure into a high pressure water injection stream into a well. The chlorine dioxide in the water injection stream removes biomass and dissolves the resultant biomass and iron sulfides that may have built up within the water injection casing and at the screen leading to the oil-producing formation. The pH of the combined injection stream is maintained at a level that avoids excessive corrosion of the injection casing, screen, or other well parts.

To make the chlorine dioxide, pressurized hydrochloric acid, sodium chlorate, sodium chlorite, and water may be mixed. Other mineral acids or proton donors may be substituted for hydrochloric acid. With the source materials under pressure, the resulting chlorine dioxide may be employed under pressure for high pressure injection.

The process may also be employed for other cleaning uses. For example, the flow of an oil-producing well can also be temporarily reversed so that chlorine dioxide can similarly be injected to clean out any build-up therein.

The explosive tendencies of chlorine dioxide have been found to be virtually eliminated by maintaining the chlorine dioxide dissolved in a non-explosive liquid. At normal ambient temperatures, this can be accomplished by subjecting the liquid stream to an elevated pressure, thereby avoiding excessive vaporization of chlorine dioxide.

Accordingly, it is an object of the present invention to provide a process for removing or controlling the build up of biomass and deposits within a water injection or oil-producing well while avoiding excessive corrosion. It is an advantage of the present process that chlorine dioxide is produced safely and without the risk of explosion. Other and further objects and advantages will appear hereinafter.

DETAILED DESCRIPTION OF THE PREFERRED EMBODIMENTS

There are two major problems in the oil field that are frequently interrelated, sulfides and microbial growth. The sulfides cause corrosion of metal in the system to metal sulfides which are insoluble. The microbial growth, particularly sulfate reducing bacteria (SRB's), can give rise to sulfides as products of their metabolism. They also cause problems due to the biomass generated which will act as a binder with other solids in the system to cause deposit problems. The result is accelerated corrosion under the deposits. There are a number of other side effects that can occur, such as formation plugging, depending on where the problems occur.

The standard approach to control of corrosion problems due to sulfides and microbial growth has been prevention and/or maintenance cleaning. For example, a biocide that will destroy SRB's will help to minimize sulfide generation and uncontrolled formation of bioresidue. Standard biocides such as quats, thiocarbamates, and amine salts have been used effectively as biostats. Due to the mutation ability of oil field bacteria, it is often necessary to use an alternating treatment of several different biocides to maintain effective control. However, these chemicals have no effect on the deposits already in place or on any sulfides already in the system.

Aldehyde-based biocides are also effective against SRB's found in the oil field. Typically, formaldehyde, acrolein, and glutaraldehyde have been used in these applications. In addition to their action as biocides, they will react with free hydrogen sulfide ($H_2S$) in the system and serve as sulfide scavengers. The basic reaction is a condensation reaction involving the formation of sulfide linkages with the aldehyde splitting out water from the reaction. As these biocides tend to be rather expensive, the cost of their use as sulfide scavengers is often too high for other than low level applications. Also, they will have no effect on reacted sulfides and other deposits already in the system.

A second route to control is through control of the sulfides with chemicals that will react to scavenge mainly $H_2S$. These chemicals generally are classed as oxidizers since $H_2S$ is easily oxidized. Examples of such chemicals are:

| Chemical | Product |
|---|---|
| Nitrites | Sulfur, NO, $NH_3$ |
| Hydrogen Peroxide | Sulfur, sulfates |
| Peroxy compounds | Sulfates |
| Ferric ion (aq.) | Sulfur |
| Iodine (aq.) | Sulfur |
| Chlorine (aq.) | Sulfur, sulfates |

These materials typically act on the sulfides, although they may have some biological activity as well. They can also cause problems due to formation of colloidal sulfur and/or generation of corrosive by-products. The sulfur can cause plugging in the system. Unless they are strong oxidizers, most of these chemicals will have no effect on deposits in-place in the system. If they are strong oxidizers, there can be associated hazards in handling the application of the chemicals in the reaction process.

Chlorine ($Cl_2$) is a strong oxidizer that has been used for many years for treating water. The action of chlorine is well known and it is very effective at low levels. Chlorine, in aqueous solution, is a powerful oxidizer that will not only destroy bacteria, but also any other material in the system that can be oxidized. It is normally handled as a liquified gas and requires special handling and equipment for effective application. Without proper control, it can result in sulfur instead of sulfates.

There are a number of oxychlorine compounds available that are also powerful oxidizers and can be used in place of chlorine. These materials have the advantages of (1) biocidal activity, (2) ability to react with sulfides to form sulfates, and (3) ability to oxidize the deposits in place. Through proper product design and application, certain of these materials can be effectively applied to problems in the oil field to take advantage of their oxidizing power.

Chlorine-containing chemicals can be either oxidizers or reducing agents depending on the system involved. An oxidation reaction involves a transfer of electrons from the chemical that is oxidized to the chemical that is reduced. A chemical that is oxidized will show an increase in positive valence or a decrease in negative valence. A chemical that is reduced shows a gain in electron(s) and will have a decrease in positive valence or an increase in negative valence. For example, in the reaction shown below, the sodium chlorite ($NaClO_2$) has a chlorine atom that shows an increase of positive valence due to loss of one electron.

The chlorite is said to be oxidized by the chlorine ($Cl_2$). The chlorine is reduced by the chlorite since it shows an increase in negative valence via a gain of one electron from the chlorite.

A nomenclature summary of chlorine compounds is provided below to serve as a reference for the further discussion of oxychlorine compounds.

| | | | |
|---|---|---|---|
| Cl− | Chloride (ion) | HCl | Hydrochloric acid |
| OCl− | Hypochlorite (ion) | HOCl | Hypochlorous acid |
| ClO2− | Chlorite (ion) | HClO2 | Chlorous acid |
| ClO3− | Chlorate (ion) | HClO3 | Chloric acid |
| ClO4− | Perchlorate (ion) | HClO4 | Perchloric acid |
| ClO2 | Chlorine Dioxide | | |

Depending on the oxidation state of the chlorine compound and the reaction involved, the chlorine compound can either gain or lose electrons. It is also important to know whether the reaction is taking place in acidic or basic media. In aqueous media, this will determine the course of the reaction and the driving force. The half cell reactions for both acidic and basic reactions are provided on the following table. All reactions are reversible ($\longleftrightarrow$).

| Oxidation State | Reaction | EMF, | Volts |
|---|---|---|---|
| −1 | Cl− $\longleftrightarrow$ | ½ Cl2 + e | −1.36 |
| +1 acidic | ½ Cl2 + H2O $\longleftrightarrow$ | H+ + HOCl + e | −1.63 |
| +3 acidic | ½ Cl2 + 2 H2O $\longleftrightarrow$ | 3 H+ + HClO2 +3e | −1.63 |
| +5 acidic | ½ Cl2 + 3 H2O $\longleftrightarrow$ | 6 H+ + ClO3− +5e | −1.47 |
| +7 acidic | ½ Cl2 + 4 H2O $\longleftrightarrow$ | 8 H+ + ClO4− + 7e | −1.34 |
| +1 basic | Cl− + 2 OH− $\longleftrightarrow$ | OCl− + H2O + 2e | −0.94 |
| +3 basic | Cl− + 4 OH− $\longleftrightarrow$ | ClO2− + 2 H2O + 4e | −0.76 |
| +5 basic | Cl− + 6 OH− $\longleftrightarrow$ | ClO3− + 3 H2O + 6e | −0.62 |
| +7 basic | Cl− + 8 OH− $\longleftrightarrow$ | ClO4− + 4 H2O + 8e | −0.51 |
| +4 acidic | ClO2− $\longleftrightarrow$ | ClO2 + e | −0.95 |
| | 2 ClO2 + H2O $\longleftrightarrow$ | ClO2− + ClO3− + 2 H+ | |

The two most commonly known chlorine-containing oxidizers are chlorine and the hypochlorites. Chlorine is a gas that is slightly soluble in water, on the order of about 1% or about 10 g./liter. Since it is normally effective in the ppm range, the solubility limits are usually not a problem except at the point of application. There has been considerable development of equipment for the measurement and feeding of chlorine into aqueous media.

The hypochlorites, commonly referred to as "bleach", represent chlorine in the aqueous form. The hypochlorites are the result of an equilibrium to produce hypochlorous and hydrochloric acids. The hydrochloric acid will be completely ionized in solution.

$$Cl_2 + H_2O \longleftrightarrow HOCl + H^+ + Cl^-$$

$$HOCl \longleftrightarrow H^+ + OCl^-$$

The hypochlorous acid will ionize as a function of the pH. As would be expected from its equilibrium equation, it ionizes only at the higher pH conditions (100% ionic at pH=10, 20% at pH=7, 0% at pH=4). As a result, hypochlorite solutions, such as sodium hypochlorite (NaOCl) are typically stored at highly alkaline pH's.

While chlorine is known as a strong oxidizing agent, in aqueous solution it is the hypochlorous acid that is the effective agent. The hypochlorite ion displays very little in terms of oxidative potential in aqueous solution. Thus, the effectiveness of chlorine in aqueous solution drops as the pH increases and the conversion of hypochlorite ion increases. Addition of large amounts of chlorine will decrease the pH dramatically due to the HCl. While the lower pH increases available oxidizing power, it also leads to corrosion problems.

Chlorine dioxide, ClO2, is an unstable oxychlorine compound that is a stronger, more selective oxidizer than chlorine. It has an appreciable solubility in water and is not subject to hydrolysis reactions of chlorine. Its oxidizing power is equivalent to about 2.6 times that of chlorine in aqueous systems. Chlorine dioxide gas is soluble in water to the extent that it can actually be separated from chlorine by stripping aqueous solutions of the two.

There are several industrial processes for generating chlorine dioxide on a continuous basis. Due to the unstable nature of the material, it is normally generated at the point of use as an aqueous solution that is directly applied. The largest industrial applications are in the pulp and paper industry where it is used for bleaching. Generally very large scale equipment designed for recycle operation is used so as to separate the chlorine dioxide from the chlorine and other by-products produced.

Equipment has been developed to manufacture small amounts of chlorine dioxide containing solutions in the oil field for direct application to processes. Such systems deliver an oxidizer stream containing a predominant amount of chlorine dioxide. Such processes are discussed in more detail below.

The main objective for the application of chlorine-containing oxidizers in the oil field is control of sulfides, biomass growth, and related corrosion. Their selective oxidizing power can also be used to improve process efficiency.

| General Properties | Cl2 | ClO2 |
|---|---|---|
| Form, 77° F., 0 psig | Gas | Gas |
| Liquid Sp.Gr., 0° | 1.47 | 1.64 |
| Melting Point, °F. | −150 | −74 |
| Boiling Point, °F. | −29 | +52 |
| Solubility in H2O, 77° F., 0 psig | 1% | 8–10% |

Chlorine is a gas that has a limited solubility in water. Above the solubility limits in water, chlorine is a gas at normal conditions.

Hypochlorous acid results from dissolving chlorine in water. It is a pH dependent equilibrium. Hypochlorite ion is normally preserved in alkaline solutions such as "bleach", or sodium hypochlorite.

$$Cl_2 + 2H_2O \longleftrightarrow H^+ + Cl^- + HOCl$$

$$HOCl \longleftrightarrow H^+ + OCl^-$$

The alkaline hypochlorite form is stable in solution and can be made up in solution strengths of 15+% at pH's of 11.0 or more. Such materials are made by the absorption of chlorine in aqueous caustic so that the material is in the form of NaOCl and NaCl. Since the oxidizing power of the chlorine is retained in the form of HOCl, it is necessary to lower the pH to obtain oxidation with "bleaches".

Chlorine dioxide dissolves to a limited extent in water as $ClO_2$. At higher concentrations, it will form hydrates. The data below give some indication of the phase behavior of aqueous $ClO_2$. Note that it will form liquid $ClO_2$ at higher concentrations (>80 g./liter). It has, as a low boiling

| Temp., °F. | ClO2, % | Solid Phase |
|---|---|---|
| — | 2.70 | $ClO_2:8H_2O$ + Ice |
| 32 | 2.76 | $ClO_2:8H_2O$ |
| 33 | 2.95 | " |
| 42 | 4.21 | " |
| 50 | 6.00 | " |
| 59 | 8.70 | " |
| 51 (triple pt) | 10.79 | $ClO_2:8H_2O$ + liquid $ClO_2$ |
|  | 11.67 | liquid $ClO_2$ |
| 57 | 10.79 | liquid $ClO_2$ | gas, a significant vapor pressure. The solutions of $ClO_2$ in water have an appreciable vapor pressure. These solutions will yield a significant concentration of $ClO_2$ gas in the vapor phase. For example, a 1 ppm solution of $ClO_2$ will generate a vapor pressure of 10 mm as $ClO_2$ in the vapor phase at O psig at equilibrium.

In aqueous solution, the presence of chlorine does not affect the solubility of chlorine dioxide. In fact, solubility differences in water can be used to separate the two materials. Note, however, that both materials can have a significant vapor pressure in dilute aqueous solution. Both of these gases are extremely reactive either in solution or in the gas phase. These materials can, in the gas phase, cause reactions that will liberate enough heat to cause autoignition. Chlorine dioxide gas is susceptible to spark ignition and does not require oxygen to support combustion. For this reason, it is necessary to avoid situations that would allow these chemicals to accumulate in the gas phase since this can lead to local buildup of explosive concentrations.

Due to the limited solubility of both chlorine and chlorine dioxide in water, systems used to generate the materials should be run under pressure. The aqueous solution from the reaction should be maintained and applied to the field process under pressure. Adequate mixing and dilution are required to insure that complete solution takes place.

Both chemicals are photoreactive, i.e., will be affected by UV light. In both cases, UV light catalyzes decomposition of the molecule. In the case of chlorine, it will react violently with anything available. In the case of chlorine dioxide, it will decompose to unstable species leading to the formation of chlorine and oxygen.

Chlorine containing oxidizers are made from chlorates and/or chlorites. One manner of making such oxidizers is by a reaction of hydrochloric acid and a blended precursor containing both sodium chlorate and sodium chlorite. Other process options are available in which other precursors can be used. These alternate process options also involve the use of hydrochloric acid. Some competitive processes are available where liquified gases such as chlorine or sulfur dioxide are used to supply the acidity for the reactions.

The hydrochloric acid is a 30% minimum solution of HCl in water. Lower solution strengths will not support the process. In general, 30% hydrochloric acid is available throughout the oil field. The simplest check on solution strength is by Sp. Gravity of the solution. The 30% material has a freeze point of −50° F. It is an extremely corrosive liquid that must be handled with plastic or plastic-lined equipment.

The two main precursors for control of biomass are chlorate/chlorite and chlorite precursor solutions. Both are used in conjunction with hydrochloric acid. Special forms of either precursor are available for special applications. Both are strong oxidizer solutions and are highly alkaline. They must be kept separated from acids and oxidizable materials.

Such precursors often contain special corrosion inhibitors for use in surface applications. The inhibitors are typically formulated as an integral part of the product and are effective at use concentrations of the reacted product. Extensive corrosion studies have been performed to verify corrosion inhibitor effectiveness.

The chlorite solutions are sometimes known as "stablilized chlorine dioxide." They can be applied directly to some systems for use as the oxidant. Dilution of the chlorite in the system lowers the pH to make the material active as an oxidizer which will undergo many of the same reactions as $ClO_2 + NaOH \rightarrow NaClO_2 + OH$ $NaClO_2 + H+ \rightarrow HClO_2 + Na+$ chlorine dioxide. Such precursors are formed from combinations of NaCl, $NaClO_2$ and $NaClO_3$.

There are two basic routes that can be used to generate chlorine dioxide, acid reduction of chlorates and oxidation of chlorites. In the commercial practice of these reactions, many differences can be built into the process to enhance yields, reduce costs, or control by-product formation. All of these processes are run on a liquid/liquid basis and do not involve the use of dry solids or gases. Water is the diluent and reaction medium.

CHLORATE REDUCTIONS

$2NaClO_3 + 4HCl \longrightarrow 2ClO_2 + Cl_2 + 2NaCl + 2H_2O$    EQ. 1

$2NaClO_3 + SO_2 \longrightarrow 2ClO_2 + Na_2SO_4$    EQ. 2

$2NaClO_3 + 2H_2SO_4 + 2NaCl \longrightarrow$    EQ. 2-A $2ClO_2 + Cl_2 + 2Na_2SO_4 + 2H_2O$ Chlorate reductions using acid are the most widely practiced industrially, particularly in the pulp/paper and textile industries. Solutions of chlorine dioxide, with or without chlorine, are used for bleaching fibers. The most common applications use sulfuric acid and/or $SO_2$ since the by-product $NaSO_4$ can be used elsewhere in the process. Also, sulfuric acid is a stronger acid, and is cheaper than hydrochloric acid. For reasons discussed below, most of the processes also use sodium chloride to increase reaction efficiency.

Equation 2-A. is the basic R-2 Process widely practiced in the pulp and paper industry. The reaction sequence requires the formation of HCl as an intermediate during the reaction from NaCl which must be part of the process. A summary of the basic reaction equations is as follows- $$2\ NaClO_3 + H_2SO_4 \longrightarrow 2\ HClO_3 + Na_2SO_4$$

$$2\ NaCl + H_2SO_4 \longrightarrow 2\ HCl + Na_2SO_4$$

$$HClO_3 + HCl \longrightarrow HClO_2 + HOCl$$

$$HClO_3 + HClO_2 \longrightarrow 2\ ClO_2 + H_2O$$

$$HOCl + HCl \longrightarrow Cl_2 + H_2O$$

ADDING, ─────────────────────

$$2NaClO_3 + 2H_2SO_4 + 2NaCl \longrightarrow \quad \text{EQ. 2-A}$$

$$2ClO_2 + Cl_2 + 2Na_2SO_4 + 2H_2O$$

Equation 2., the OLIN Chlorate Process, is an extension of the R-2 Process shown in Equation 2-A. In simple form, it is as follows- $$2\ NaClO_3 + H_2SO_4 \longrightarrow 2\ HClO_3 + Na_2SO_4$$

$$2\ HClO_3 + SO_2 \longrightarrow 2\ ClO_2 + H_2SO_4$$

ADDING, ─────────────────────

$$2\ NaClO_3 + SO_2 \longrightarrow 2\ ClO_2 + 2\ Na_2SO_4 \quad \text{EQ. 2}$$

This reaction is also promoted by chlorides in the reaction mixture, probably via the following equations, based on the intermediate $H_2SO_4$ step in the reaction sequence shown (or through bisulfite and bisulfates).

$$SO_2 + 2\ H_2O \rightarrow H_2SO_4 + H_2$$

$$2\ NaCl + H_2SO_4 \rightarrow 2\ HCl + Na_2SO_4$$

The literature indicates that a 1:1 to 1:1.15 mole ratio of chlorate:chloride provides about the optimum in yield on a commercial basis.

Although only chlorine dioxide is shown in the yield of Equation 2., it is found in commercial practice that this is only possible at very low efficiencies. In reality, some chlorine is produced at the expense of $ClO_2$ in processes using chlorides to promote the reaction. It probably takes place via the following reactions- $$HOCl + HCl \rightarrow Cl_2 + H_2O$$

$$NaClO_3 + 6\ HCl \rightarrow 3\ Cl_2 + 3\ H_2O + NaCl$$

With optimum operation, commercial processes with recycle operation still will produce about an 80/20 mixture of $ClO_2/Cl_2$ as reaction yield. Chlorine output can be further effected by the concentration of $SO_2$ used- $$SO_2 + Cl_2 + 2\ H_2O \rightarrow 2\ HCl + H_2SO_4$$

Hydrochloric acid reduction of chlorates is a viable process since the acid is readily available in operating areas of the oil field and the acid provides some benefits to the process. The actual acid reduction process is shown below to provide the summary reaction as Equation 1.

$$2\ NaClO_3 + 2\ HCl \longrightarrow 2\ HClO_3 + 2\ NaCl$$

$$HClO_3 + HCl \longrightarrow HClO_2 + HOCl$$

$$HClO_3 + HClO_2 \longrightarrow 2\ ClO_2 + H_2O$$

$$HOCl + HCl \longrightarrow Cl_2 + H_2O$$

ADDING, ─────────────────────

$$2\ NaClO_3 + 4\ HCl \longrightarrow \quad \text{EQ. 1}$$

$$2\ ClO_2 + Cl_2 + 2\ H_2O + 2\ NaCl$$

Without other considerations, the process of Equation 1 should perform similarly to that of Equation 2-A without the need for NaCl. There are some additional considerations regarding use of NaCl in the reaction which are discussed later. However, the $HClO_3$ and $HClO_2$ reaction will not occur in the absence of chlorides.

CHLORITE OXIDATIONS

EQ. 3. $5\ NaClO_2 + 4\ HCl \rightarrow 4\ ClO_2 + 5\ NaCl + 2\ H_2O$

EQ. 4. $2\ NaClO_2 + Cl_2 \rightarrow 2\ ClO_2 + 2\ NaCl$

Chlorite oxidation to produce chlorine dioxide is not widely practiced on an industrial scale due to the higher costs involved. These costs are due mainly to the fact that chlorite is obtained from chlorate via generation of chlorine dioxide as an intermediate step. Extensive processing is required to generate and separate the chlorite.

$$2\ NaClO_3 + SO_2 \rightarrow 2\ ClO_2 + Na_2SO_4$$

$$ClO_2 + 2\ NaOH \rightarrow NaClO_2 + NaClO_3 + H_2O$$

$$NaClO_3 + SO_2 + 2\ NaOH \rightarrow NaClO_2 + Na_2SO_4 + H_2O$$

The most accepted basic reactions for Equation 3 are shown below. This reaction sequence requires the generation of chlorine as an intermediate in the process. Without other alterations to the process, the chlorite is completely consumed but the yield $$NaClO_2 + HCl \longrightarrow HClO_2 + NaCl$$

$$HClO_2 + 3\ HCl \longrightarrow 2\ Cl_2 + 2\ H_2O$$

$$4\ NaClO_2 + 2\ Cl_2 \longrightarrow 4\ ClO_2 + 4\ NaCl$$

ADDING, ─────────────────────

$$5\ NaClO_2 + 4\ HCl \longrightarrow 4\ ClO_2 + 5\ NaCl + 2\ H_2O \quad \text{EQ. 3}$$

does not exceed 80% of theoretical based on Eq. 3. The most accepted side reaction sequence is- $$4\ NaClO_2 + 2\ HCl \rightarrow 2\ ClO_2 + NaClO_3 + 3\ NaCl + H_2O$$

AND, $4\ NaClO_2 + 4\ HCl \rightarrow 2\ Cl_2 + 3\ O_2 + 2\ H_2O \rightleftharpoons 4\ NaCl$ (3-e)

Control of reaction parameters and reactant concentrations is critical as it plays a large role in the actual process output. In commercial practice, the reactor output is chlorine dioxide plus some chlorine and chlorate. Note that the last three reactions above represent a range of chlorite/acid mole ratios of only 1:1 to 2:1 with the optimum ratio being 1.2:1.

The basis for Equation 4 is very similar to Equation 3 since it involves directly the use of chlorine as the oxidant on the chlorite via the hypochlorite.

$$Cl_2 + H_2O \rightarrow HOCl + HCl$$

$$NaClO_2 + HCl \rightarrow HClO_2 + NaCl$$

$$NaClO_2 + HOCl \rightarrow HClO_3 + NaCl$$

$$HClO_3 + HClO_2 \rightarrow 2\ ClO_2 + H_2O$$

ADDING, $$2\ NaClO_2 + Cl_2 \rightarrow 2\ ClO_2 + 2\ NaCl \quad EQ.\ 4$$

Since the same side reactions can occur for Eq. 4 as for Eq. 3, there is a reasonable expectation of some chlorate by-product from this reaction. If conversion efficiency is not absolute, there will be some reacted chlorine also.

In summary, then, there are two routes to chlorine dioxide on a commercial scale, chlorate reduction with acids/chlorides and chlorite oxidation. Each of the reactions has technical advantages depending on what end result is required. From the intermediate reactions, there are possible ways in which the reaction efficiency can be enhanced. Before considering means for enhancing yields from these reactions, it is useful to first examine the theoretical yields on an economic basis.

Application of chlorine dioxide containing oxidants in the oil field present a different challenge from the applications in the textile and pulp/paper industries. The major differences are constraints in size of the applications, materials handling, economics, and simplicity of operation in remote locations. Most of the reaction technology as practiced in other industries is too complex and cumbersome to be adapted directly to the field. For example, in the typical pulp/paper process, the quantities involved are large (tons/day) and involve production of purified chlorine dioxide which is produced and stored in dilute solution for subsequent application in the bleaching process. Such an approach in the oil field would not be effective due to cost of facilities. Fortunately, such facilities and complexity need not be required for economic operation in the oil field.

To define practice in the oil field, it is useful to relate the different possible reaction schemes in terms of operating characteristics and costs from the previous discussion. The basic parameters are summarized in Table D below. All four processes are available in the oil field today.

$$2\ NaClO_3 + 4\ HCl \rightarrow 2\ ClO_2 + Cl_2 + 2\ NaCl + 2\ H_2O \quad EQ.\ 1$$

$$2\ NaClO_3 + SO_2 \rightarrow 2\ ClO_2 + Na_2SO_4 \quad EQ.\ 2$$

$$5\ NaClO_2 + 4\ HCl \rightarrow 4\ ClO_2 + 5\ NaCl + 2\ H_2O \quad EQ.\ 3$$

$$2\ NaClO_2 + Cl_2 \rightarrow 2\ ClO_2 + 2\ NaCl \quad EQ.\ 4$$

TABLE D

| | EQ. 1 | EQ. 2 | EQ. 3 | EQ. 4 |
|---|---|---|---|---|
| INPUT REACTANT - FORM | CHLORATE SOLUTION | CHLORATE SOLUTION | CHLORITE SOLUTION | CHLORITE SOLUTION |
| INPUT CO-REACTANT - FORM | ACID, HCl | $SO_2$ | ACID, HCl | $Cl_2$ |
| THEORETICAL YIELDS - | | | | |
| $ClO_2$/LB. INPUT | 0.634 | 0.634 | 0.597 | 0.746 |
| "TOTAL OXID"/LB. INPUT | 0.967 | 0.634 | 0.597 | 0.746 |
| BY-PRODUCTS FORMED | NaCl | $Na_2SO_4$ | NaCl | NaCl |
| SIDE REACTIONS | **** | CHLORINE | CHLORINE CHLORATE | CHLORINE CHLORATE |

EQ. 1: Advantages - Cost of input chemicals and materials handling. Disadvantages - can produce more chlorine than other processes.
EQ. 2: Advantages - cost of input chemicals and lower chlorine yield. Disadvantages - requires handling liquidifed gas and produces sulfates.
EQ. 3: Advantages - good yield of chlorine dioxide and lower chlorine yield. Disadvantages - cost of input chemicals and control needed to minimize by-product formation of chlorine and chlorate.
EQ. 4: Advantages - good yield of chlorine dioxide and lower chlorine content. Disadvantages - cost of input chemicals, requries handling liquified gas, and by-product formation of chlorate.

Disadvantages-cost of input chemicals, requires handling liquified gas, and by-product formation of chlorate.

A first example of chlorine dioxide preparation in commercial oil field practice is based on acid reduction of chlorate to produce an oxidant stream containing a predominant amount of chlorine dioxide as the oxidizer. The basic chemistry of Equation 1 has been modified to optimize yields and to minimize costs and chlorine content. The precursor for reaction is a mixture of chlorate/chlorite/chloride which is reacted with 30% hydrochloric acid. The approximate mole ratio of chlorate/chlorite/chloride used is 8/1/4 with additional chloride being supplied by the hydrochloric acid. The effects of added chlorite on the chlorate process can be seen from the reaction equations where Eq. 3 is fully stated using Eq. 4 to describe the chlorite/chlorine reactions following.

$$2\ NaClO_3 + 2\ HCl \rightarrow 2\ HClO_3 + 2\ NaCl$$

$$HClO_3 + HCl \rightarrow HClO_2 + HOCl$$

-continued $$HClO_3 + HClO_2 \longrightarrow 2 ClO_2 + H_2O$$

$$HOCl + HCl \longrightarrow Cl_2 + H_2O$$

$$2 NaClO_3 + 4 HCl \longrightarrow 2 ClO_2 + Cl_2 + 2 H_2O + 2 NaCl \quad \text{EQ. 1}$$

$$3 NaClO_2 + 3HCl \longrightarrow 3 HClO_2 + 3 NaCl$$

$$HClO_2 + 3 HCl \longrightarrow 2 Cl_2 + 2 H_2O$$

$$2 Cl_2 + 2 H_2O \longrightarrow 2 HOCl + 2 HCl$$

$$2 NaClO_2 + 2 HOCl \longrightarrow 2 HClO_3 + 2 NaCl$$

$$2 HClO_3 + 2 HClO_2 \longrightarrow 4 ClO_2 + 2 H_2O$$

$$5 NaClO_2 + 4 HCl \longrightarrow 4 ClO_2 + 5 NaCl + 2 H_2O \quad \text{EQ. 3}$$

If the chlorine is already generated via the process of EQ. 1., then only the process of EQ. 4 needs to be considered, i.e.-

EQ. 4: $2NaClO_2 + Cl_2 \rightarrow 2 ClO_2 + 2 NaCl$

If the mole ratio is 8/1/4 chlorate/chlorite/chloride then the mole of $NaClO_2$ could use up 0.5 moles of $Cl_2$ to produce one mole of $ClO_2$ on a theoretical basis. The net reaction on this basis would be- $8 NaClO_3 + 16 HCl \rightarrow 8 ClO_2 + 4 Cl_2 + 8 H_2O + 8 NaCl$ $NaClO_2 + 1/2 Cl_2 \rightarrow ClO_2 + NaCl$ $-8 \ NaClO_3 + NaClO_2 + 16 \ NCl \rightarrow 9 \ ClO_2 + 3\text{-}1/2 \ Cl_2 + 8 H_2O + 9 NaCl$ This does not take into account the effects of NaCl or side reactions that can take place via either mechanism. The major thing to note is that the reactions overlap and feed each other in the two mechanisms.

If the typical volume ratio of precursor:acid:water is 1.0:1.1:0.9, this would be approximately at 8:1:21 mole ratio for chlorate:chlorite:acid. Excess acid is to drive the reaction. On this basis, the theoretical composition of the yield from one gallon of precursor would be- $ClO_2 = 2.2$ lb.

$Cl_2 = 0.9$ lb.

$NaCl = 2.7$ lb. (INPUT + YIELD)

These results are achieved only if the reaction is 100% efficient, i.e., actual is equal to theoretical. In practice, even with the excess acid, the reaction cannot produce theoretical yields because it is being run in diluted solution phase on a once-through basis. Actual yield of total oxidant from current reactors with the 1.0: 1.1:0.9 volume ratio is about 0.5 lb. Compared with the theoretical yield, this is an efficiency of about 16.2% (i.e. 0.5/3.09).

There are several factors that effect operating efficiencies. These include reactor residence time, input water, and precursor:acid ratios. Longer residence time, lowering water input, and increasing acid will all tend to increase yields of oxidant from the reaction (make a "hotter" product) to yield up to three times as much oxidant. However, it should be noted there are practical limits that must be observed since there are also practical limits on how much oxidant that can be handled in the reactor effluent stream. At nominal output of 0.5 lb/gal precursor, oxidant in the effluent stream would be about 20 g./liter (14 g/l $ClO_2$ and 6 g/l $Cl_2$). Even at this level, there is considerable tendency to develop a gas phase in the reactor effluent.

Looking to a second example, chlorate reduction with sulfur dioxide is the process of EQ. 2 where $SO_2$ and NaCl are used to generate chlorine dioxide via a modified R-2 process where EQ. 2-A represents the reaction chemistry to some degree. Although not shown as products from EQ. 2, the reaction must yield by-product chlorine.

$$SO_2 + 2 H_2O \longrightarrow H_2SO_4$$

$$H_2SO_4 + 2 NaCl \longrightarrow 2 HCl + Na_2SO_4$$

$$2 NaClO_3 + H_2SO_4 \longrightarrow 2 HClO_3 + Na_2SO_4$$

$$2 NaCl + H_2SO_4 \longrightarrow 2 HCl + Na_2SO_4$$

$$HClO_3 + HCl \longrightarrow HClO_2 + HOCl$$

$$HClO_3 + HClO_2 \longrightarrow 2 ClO_2 + H_2O$$

$$HOCl + HCl \longrightarrow Cl_2 + H_2O$$

$$2 NaClO_3 + 2 H_2SO_4 + 2 NaCl \longrightarrow \quad \text{EQ. 2-A}$$
$$ClO_2 + Cl_2 + 2 Na_2SO_4 + 2 H_2O$$

$$2 NaClO_3 + H_2SO_4 \longrightarrow 2 HClO_3 + Na_2SO_4$$

$$2 HClO_3 + SO_2 \longrightarrow 2 ClO_2 + H_2SO_4$$

$$2 NaClO_3 + SO_2 \longrightarrow 2 ClO_2 + Na_2SO_4 \quad \text{EQ. 2}$$

As it turns out, this is the case in actual operation and approximate EQ. 2-A unless extensive recycle equipment is used as in the pulp/paper industry.

Assuming use of a 25% solution of $NaClO_3$ and $SO_2$ from liquified gas, the

| yields from EQ. 2 would be | | yields from EQ. 2-A would be | |
|---|---|---|---|
| $ClO_2$ | 1.6 lb. | $ClO_2$ | 1.6 lb. |
| $Cl_2$ | 0 lb. | $Cl_2$ | 0.8 lb. |
| $Na_2SO_4$ | 1.7 lb. | $Na_2SO_4$ | 3.4 lb. |

The yield from EQ. 2 is only 52% of the theoretical yield of the foregoing example. The efficiency would have to be twice that of the foregoing example to yield the same amount of material. For EQ. 2-A, the yield is 78% of the foregoing example so that the efficiency of EQ. 2-A must be 1.3X to deliver the same amount of material.

EQ. 2 and 2-A produce a considerable amount of sulfate in the reactor effluent and this would require dilution water to prevent salting up the reactor. The addition of dilution water to any of these reactions tends to quench the reaction and lower the yields.

In terms of economics, this example could be competitive with the prior example. Handling $SO_2$ in the field, however, would present some significant materials problems. $SO_2$ is a liquified gas (b.p.+14° F.). In an aqueous system, it is extremely corrosive. It would require heating under certain circumstances.

A third example is based on the acid oxidation of a 25% sodium chlorite solution by the process of EQ. 3.

$$3\ NaClO_2 + 3\ HCl \longrightarrow 3\ HClO_2 + 3\ NaCl$$

$$HClO_2 + 3\ HCl \longrightarrow 2\ Cl_2 + 2\ H_2O$$

$$2\ Cl_2 + 2\ H_2O \longrightarrow 2\ HOCl + 2\ HCl$$

$$2\ NaClO_2 + 2\ HOCl \longrightarrow 2\ HClO_3 + 2\ NaCl$$

$$2\ HClO_3 + 2\ HClO_2 \longrightarrow 4\ ClO_2 + 2\ H_2O$$

$$5\ NaClO_2 + 4\ HCl \longrightarrow 4\ ClO_2 + 5\ NaCl + 2\ H_2O \quad \text{EQ. 3}$$

As shown in the combined mechanisms the process involves the internal generation of both chlorine and chlorate to produce the chlorine dioxide as yield. In actual practice, the yield is mainly chlorine dioxide with some chlorine and chlorate as the by-products. Assuming use of a 25% solution of $NaClO_2$ (2.5 lbs.) and 30% HCl as the acid, the yield from one gallon of precursor would be-

|      |         |
|------|---------|
| $ClO_2$ | 1.5 lb. |
| $Cl_2$  | 0 lb.   |
| NaCl | 1.6 lb. |

The volume ratio of precursor acid would be 1.0:0.1. In actual practice, more acid is used and the theoretical yield is not obtained. It is of interest to note that the theoretical yield from this process is about one-half that of the first example. On this basis, the chlorite process efficiency would have to be twice that of the first example to yield the same amount of material.

The chlorite/chlorine process of EQ. 4 is available to the oil field. It has the same drawbacks as the just prior process in that it is very costly. In addition, it requires the handling of liquified chlorine as one of the reactants. This reaction is more cost effective than the just prior process, but it will tend to yield the same by-products. Residual chlorine can also be expected to be in the reactor effluent. Chlorine is corrosive and the process has the same materials handling disadvantages as the chlorate/$SO_2$ process.

$$Cl_2 + H_2O \longrightarrow HOCl + HCl$$

$$NaClO_2 + HCl \longrightarrow HClO_2 + NaCl$$

$$NaClO_2 + HOCl \longrightarrow HClO_3 + NaCl$$

$$HClO_3 + HClO_2 \longrightarrow 2\ ClO_2 + H_2O$$

$$2\ NaClO_2 + Cl_2 \longrightarrow 2\ ClO_2 + 2\ NaCl \quad \text{EQ. 4}$$

The expected yields of the process using a 25% $NaClO_2$ precursor would be-

|      |         |
|------|---------|
| $ClO_2$ | 1.9 lb. |
| $Cl_2$  | 0 lb.   |
| NaCl | 1.6 lb. |

An initial phase of the process of a preferred embodiment of the present process involves mixing water, hydrochloric acid, sodium chlorate, sodium chlorite, and, optionally, sodium chloride, the mixing typically occurring under pressure. These ingredients may be mixed in a continuous flow reactor system which has three feed streams and one product stream. One feed stream is water. The second feed stream is composed of hydrochloric acid. The third contains the precursor stream comprised of sodium chlorate, sodium chlorite, and optional sodium chloride in a water stream.

Figure 1:
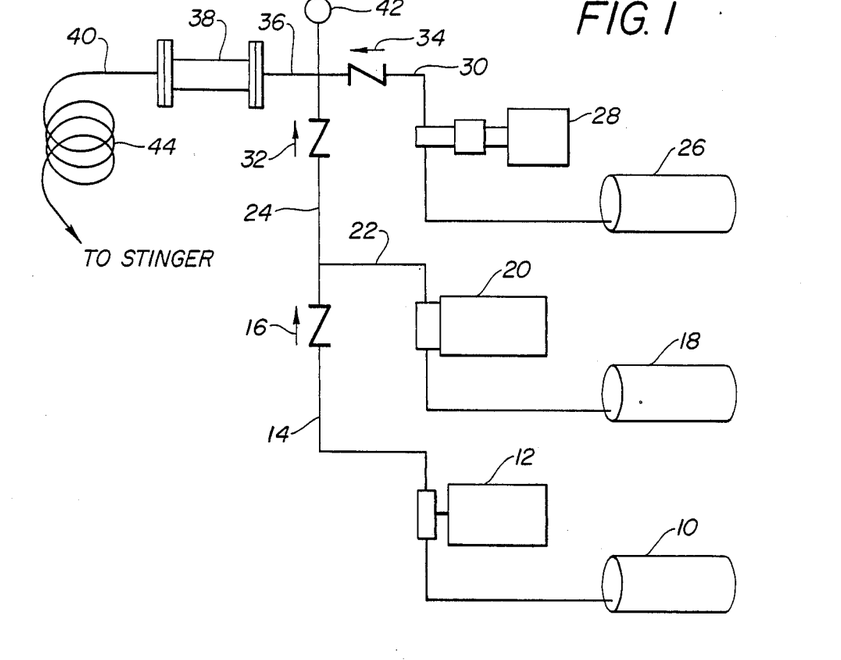
FIG. 1 illustrates schematically a process reactor of a first of the present invention.

Turning in detail to the drawing, a schematic of a preferred embodiment of the process reactor system is illustrated in FIG. 1. A tank 10 contains a precursor comprised of sodium chlorate, sodium chlorite, and optional sodium chloride in a water base. This mixture is pumped by a precursor pump 12 in a precursor feedstream 14 through a check valve 16. A tank 18 contains water which is pumped by a water pump 20 in a feedstream 22 and combined with the feedstream 14 to form feedstream 24. Another tank 26 contains hydrochloric acid, which is pumped by an acid pump 28 in a feedstream 30. The feedstream 24 is pumped past a check valve 32 and the feedstream 30 is pumped past a check valve 34 where they are combined to form a reaction stream 36. The reaction stream 36 passes into a high pressure reactor 38 that is equipped with an in-line mixer.

A product stream 40 contains the resultant compounds, including a large proportion of chlorine dioxide. The pressure of the entire system is to be maintained at a level sufficient to keep the chlorine dioxide dissolved within the reaction mixture in a product stream 40. A pressure gauge 42 may be located near a reactor 38 or at any other convenient location. Normal pressures exceed 500 psi. The reactor 38 preferably operates at a pressure between 500 and 5000 pounds per square inch so that it may be readily used for downstream injection, either directly or through a booster pump, into the water injection well with a typical temperature of about 130° F.

The hydrochloric acid stream 30 advantageously may be approximately 30% hydrogen chloride by weight, and a chlorine dioxide precursor stream 14 contains more than 10% sodium chlorate and/or sodium chlorite. At levels above 35%, the capacity to solubilize can be exceeded. In a more preferred embodiment, the precursor stream 14 contains approximately 28% sodium chlorate, approximately 3% sodium chlorite and about 7% sodium chloride. It would be obvious to one of ordinary skill in the art to optimize the feed rate of the various feed streams to obtain the most efficient and economical result. Given the streams just described, the preferred embodiment would continuously feed equal parts of each of the three feed streams 14, 22 and 30. Such a reaction would produce a product stream 40 containing roughly one pound of chlorine dioxide for every gallon of precursor feed stream 14 and the product stream 40 would have a pH of approximately 0.5.

While the use of sodium chloride is optional, it tends to increase the chlorine dioxide yield. On the other hand, it also results in increased salt formation and, therefore, requires additional water to adequately flush the reactor system. One optimization embodiment may involve the use of a slightly larger ratio of hydrochloric acid to the other two feed streams, resulting in a ratio of hydrochloric acid stream 30 to the water stream 22 to the precursor feed stream 14 of approximately 1.0/0.5/0.5. Of course, the optional ratio will vary depending on the conditions present at each individual site.

In addition, any strong mineral acid or other proton donor (e.g., sulfuric acid, nitric acid, or oxalic acid) can be used as a substitute for hydrochloric acid. For various reasons, such as the relative expense of the component or the resulting salt or other deposit formations, however, hydrochloric acid is the component of choice.

Given the low pH of the reaction product, it is important to construct the reactor system of material not subject to excessive corrosion. One preferred embodiment of the present process utilizes a high pressure reactor system composed of, for example, molybyenum alloy such as one of the family of "HASTELLOY" alloys manufactured by Cabot Stellite Division, Kokomo, Ind., for all items downstream from check valve 32.

Given the generally explosive nature of chlorine dioxide, or the need to maintain it in a dissolved, pressurized state, it is preferable that the chlorine dioxide be manufactured on-site. Such a reactor system, producing sufficient amounts of chlorine dioxide to service a typical water injection well, can be readily constructed on a truck or trailer to be transported to the site of the well.

At the well site, the product stream 40 is fed to the well. Several possible applications are possible. A stinger, also constructed of non-corrosive material such as one of the "HASTELLOY" materials discussed above, may be inserted into the injection well tubing. The stinger should be inserted to a depth such that any product stream emanating from the stinger tip will readily mix with the injection water and, thus, flow down into the injection well casing. To serve the same purpose of adequate and quick mixing, the stinger may be equipped with centralizers to maintain the tip of the stinger in the center of the injection well tubing. For increased adaptability, a preferred embodiment has a section of flexible hose or tubing 44 connecting the reactor system to the stinger apparatus. This tubing 44 should have a non-corrodable inner surface such as "TEFLON". Alternatively, a spool may be employed. Of course, the spool must also be of noncorrosive material. A coiled tube may also be used which is inserted through the well head to the depth of the perforations downhole. As such coiled tubing is not typically made of corrosion-resistant material, care must be taken to insure effective corrosion control throughout the treatment.

If the production process reactor is maintained at a sufficient pressure, injection into the injection well tubing will be easily accomplished. Standard water injection wells are designed to operate in the range of one thousand to four thousand psi and a higher pressure in the reactor system will enable simple injection.

The range of injection concentration as well as the amount of time during which the chlorine dioxide stream is injected can be varied to optimize the particular system. To avoid excessive corrosion of the injection well tubing or casing, it is preferable to maintain the rate of chlorine dioxide stream injection at a level so that the pH of the combined water injection and chlorine dioxide streams remains at 4.5 or above.

Figure 2:
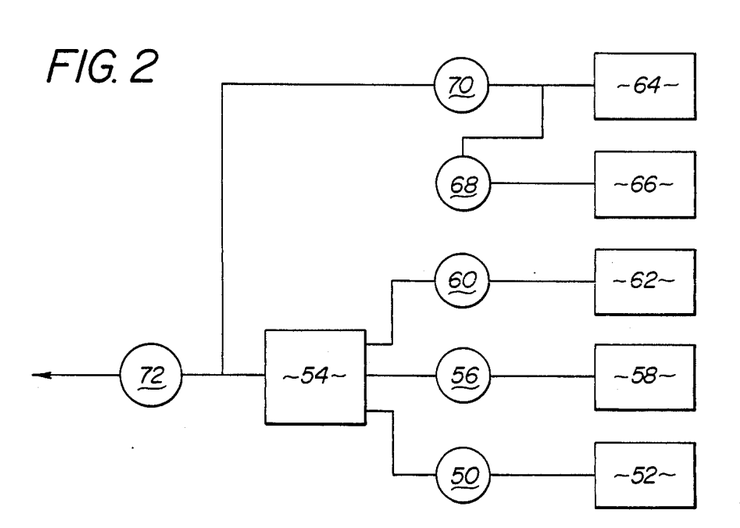
FIG. 2 illustrates schematically a process reactor of a second embodiment of the present invention.

A second embodiment employed with the present system is illustrated in FIG. 2. In this system, a low pressure generator is used with a high pressure booster. Equipment costs and safety considerations suggest the use of such a low pressure generator system with a booster to achieve well head pressures. Looking to FIG. 2, a precursor pump 50 delivers precursor from tank 52 to the low pressure reactor 54. The reactor may be maintained at about 500 psi. An acid pump 56 similarly delivers acid from a tank 58 and a water pump 60 delivers water from a source 62.

Injection water is taken from a source 64. Inhibitor is added from a tank 66 by a pump 68 to the water stream. A recirculating pump 70 drives the water/inhibitor mixture to a high pressure booster pump 72. The product from the low pressure reactor 54 joins the water before the high pressure booster pump 72. The high pressure stream is then injected into the well.

A corrosion inhibitor is preferably employed. Injection rates are such that the pH of the effluent stream into the well are low and in the acid corrosion regime. Standard inhibitors used in surface applications are not effective in this type of application. The surface applications are normally at low dosages (<0.05% as precursor) and metal-containing inhibitors are effective. Chromium, from sodium dichromate, is a good example. Standard surface inhibitors actually accelerate the corrosion. So inhibitors which inhibit both the oxidizer and acid corrosion experienced at high dosages of oxidant stream are needed. A preferred inhibitor is to be effective at the lower pH ranges and is preferably similar to a standard acid corrosion inhibitor as could be used in acidizing. It must not contain, however, components that would be reactive with the oxidant stream.

A typical clean-out procedure might involve setting up the chlorine dioxide injection system of the present invention when the flow rate of the water injection oil well has decreased to 25 to 50 percent of its original pumping capacity. If the well is a typical 1000-2000 barrel per day water injection well, the standard clean-out procedure might involve processing 30 gallons per hour of the precursor stream and injecting the resultant product stream into the well for a period of somewhere between 1 and 24 hours. After an appropriate treatment, typically more than 75% of the original pumping capacity of the well is restored.

In a specific example, water injection well treatment at a depth 1500 to 1600 feet into unconsolidated sand formations has been undertaken for six to twelve hours while the well continues to take water with no shut down. One to two drums of precursor and one to two drums of 30% HCl have been used to create an oxidant stream over the course of the pumping time. Results from such testing indicates that such a process is comparable for clearing wells to a normal acid job consisting of treatment with 1000 gal. of 15% HCl. Such a normal treatment involves shutting in the well, treating the well and leaving it shut in for up to 24 hours. The precursor has been a 9/1 mixture of sodium chlorate/sodium chlorite which is reacted with HCl. Sodium chlorite may also be used as an alternative precursor.

Under proper conditions where reactive material is present in the well, sodium chlorite may be injected by itself. Such reactive materials would include hydrogen sulfide. Reaction with the sodium chlorite would then occur in situ to create the oxidant. Such surface treatment with sodium chloride is typically referred to as "stabilized chlorine dioxide" treatment. The sodium chlorite may be made by absorbing a stream of chlorine dioxide in an aqueous sodium hydroxide solution.

While the emphasis of this specification has been on improving the flow rate in an injection well, the principles can easily be applied to oil-producing wells as well. The process would be the same except that, during the treatment period, the direction of flow in the oil-producing well would have to be reversed so that water and the chlorine dioxide mixture are injected into the oil-producing well.

The product stream injected into the well causes irreversible oxidation and hydrolysis of protein groups in the microorganisms and in the polysaccharide exopolymers that cover and bind the biomass to equipment surfaces. This process denatures enzymes such as triosephosphate dehydrogenase. The treatment of the present invention has a higher contact effectiveness than non-oxidizing compounds because it breaks down the bacterium's protective glycocalyx. The process of the present invention is capable of rapidly controlling both aerobic and anaerobic biomass as well as eliminating the accompanying biomass that plugs the equipment. Further, it can eliminate corrosive hydrogen sulfide and dissolve abrasive iron sulfide deposits. The process will control build-up and can open up the screen, thereby allowing the well to inject more water. This clean-out process also leads to a marked decrease in casing and tubing corrosion over certain other practices.

One of the primary advantages of the present invention is that it can allow for the utilization of the entire product stream from the chlorine dioxide production process. Because the water used in water injection oil wells often contains a wide variety of impurities, there is no need to purify the chlorine dioxide prior to injection. The entire effluent of the reaction process is injected into the water injection stream.

The ultimate result of being able to inject the entire effluent is a dramatic cost improvement over the clean-out methods of the prior art. The prior art methods of injecting hydrochloric acid or other materials can cost up to $100,000 per procedure. Even with this high cost, these methods are unable to achieve the results attainable by the present process. Further, the present process costs less than half of that amount.

Thus, a chlorine dioxide production process is disclosed for injection into a water injection or oil-producing oil well for controlling and removing the build-up of biomass and resulting iron sulfide that would decrease the water flow into the injection system. While embodiments and applications of this invention have been shown and described, it would be apparent to those skilled in the art that many more modifications are possible without departing from the inventive concepts herein. For example, it is contemplated that the chlorine dioxide product stream could be injected into the oil well water system at a variety of locations. The invention, therefore, is not to be restricted except in the spirit of the appended claims.

What is claimed is:

1. A process for cleaning a producing well, the process comprising the steps of
   stopping the pumping of oil out of the wall;
   generating an aqueous solution of chlorine dioxide gas under pressure; and
   injecting under pressure the solution of chlorine dioxide gas into a pumped water injection stream and thereafter under pressure into the well.

2. The process of claim 1 wherein the chlorine dioxide is generated at a pressure of at least about 500 psi.

3. The process of claim 1 wherein the step of injecting the chlorine dioxide includes pumping the chlorine dioxide generated to at least the pressure of the pumped water injection stream.

4. The process of claim 1 wherein said step of generating chlorine dioxide is at a pressure equal to or greater than the pressure of the pumped water injection stream.

5. The process according to claim 1 wherein the chlorine dioxide gas is generated at a pressure ranging from 500 to 5000 psi.

6. A process for controlling the build-up of biomass, iron sulfides and other accumulations within a water injection or oil-producing well, the process comprising:
   injecting chlorine dioxide gas dissolved in a stream containing at least water into a pumped water injection stream to thereby form a pressurized aqueous solution of chlorine dioxide gas and thereafter injecting said solution under pressure into a water injection or oil-producing well.

7. The process of claim 6 wherein the chlorine dioxide is injected at a rate such that the pH of the pumped water injection stream after the chlorine dioxide is injected remains equal to or above 4.5.

8. The process of claim 7 wherein the chlorine dioxide is injected for a period of 1 to 24 hours.

9. The process of claim 6 wherein the chlorine dioxide is injected for a period sufficient to restore the water injection or oil-producing well to at least 75% of its original capacity.

10. The process of claim 6 wherein the chlorine dioxide is injected into the pumped water injection stream in the water injection or oil-producing well at a point sufficient to ensure adequate mixing of the chlorine dioxide in the pumped water injection stream.

11. The process of claim 6 wherein the process is also used for controlling the build-up of synthetic and organic polymers within a water injection or oil producing well.

12. A process for controlling the build-up of sulfides, biomass and other accumulations within a water injection or oil-producing well having a pumped water injection stream, the process comprising the steps of
   (a) mixing the following feed streams:
       (1) a proton donor stream; and
       (2) a stream containing a chlorine dioxide precursor and water to thereby generate an aqueous solution of chlorine dioxide gas;
   (b) maintaining the resulting aqueous chlorine dioxide gas stream at a pressure sufficient to keep the chlorine dioxide gas dissolved; and
   (c) injecting under pressure the aqueous chlorine dioxide gas solution stream into the pumped water injection stream and thereafter under pressure into the water injection or oil-producing well.

13. The process of claim 12 wherein the step of mixing feed streams further includes a water stream.

14. The process of claim 12 wherein the chlorine dioxide precursor contains sodium chlorate and water.

15. The process of claim 12 wherein the chlorine dioxide precursor contains sodium chlorite and water.

16. The process of claim 12 wherein the chlorine dioxide precursor contains sodium chlorate, sodium chlorite, sodium chloride and water.

17. The process of claim 12 wherein the proton donor stream is a hydrochloric acid feed stream which comprises about 30% by weight HCl.

18. The process of claim 7 wherein the chlorine dioxide precursor contains about 28% by weight sodium chlorate, about 3% by weight sodium chlorite, about 7% by weight sodium chloride, and water.

19. The process of claim 12 wherein the chlorine dioxide precursor contains at least 25% by weight sodium chlorate, at least 2% by weight sodium chlorite and water.

20. The process of claim 19 wherein the three feed streams are mixed in substantially equal amounts.

21. The process of claim 20 wherein the amount of the proton donor mixed in the process exceeds the amount of sodium chlorate mixed in the process.

22. The process of claim 12 wherein the feed streams are mixed in a ratio that makes the pH of the product stream about 0.5.

23. The process of claim 12 wherein the chlorine dioxide gas is injected into the water stream where the well head is at a pressure ranging from 500 to 5000 psi.

24. A process for cleaning a producing well, the process comprising the steps of
stopping the pumping of oil out of the well;
selecting an oxidant reactive with hydrogen sulfide under downhole conditions; and
injecting said oxidant under pressure into a pumped water injection stream and thereafter under pressure into a well containing hydrogen sulfide.

25. The process of claim 24 wherein said oxidant is sodium chlorite.

26. A process for cleaning an oil-producing or water injection well, the process comprising the steps of:
generating chlorine dioxide gas;
mixing the chlorine dioxide gas with water under pressure sufficient to form an aqueous solution of chlorine dioxide gas;
raising the pressure above the aqueous solution of chlorine dioxide gas to wellhead pressure; and
injecting under pressure the aqueous solution of chlorine dioxide gas into the well.

27. The process according to claim 26 wherein
the aqueous solution of chlorine dioxide gas is injected into the water injection or oil-producing well at a pressure greater than the pressure sufficient to form the aqueous solution of chlorine dioxide gas.

28. The process according to claim 26 wherein the chlorine dioxide gas is generated at a pressure ranging from 500 to 5000 psi.

29. A process for facilitating the removal of biomass and other deposits from injection wells, the process including the following steps:
generating chlorine dioxide gas in a liquid media to thereby form a solution of chlorine dioxide gas in the liquid media under a pressure sufficient to dissolve the chlorine dioxide in the media;
providing a high pressure water stream;
injecting the solution of chlorine dioxide gas into the high pressure water stream to thereby form a high pressure water-liquid media chlorine dioxide gas solution;
directing the high pressure water-liquid media chlorine dioxide gas solution into a water injection well; and
removing water and liquid media through a different well at a site remote from the site of the water injection well.

30. A process according to claim 29 wherein the liquid media is water and the chlorine dioxide solution is an aqueous solution of chlorine dioxide.

31. A process according to claim 29 wherein the chlorine dioxide solution is generated at a pressure ranging up to 5000 psi.

32. A process according to claim 29 wherein the high pressure water-liquid media solution of chlorine dioxide has a pH equal to or greater than 4.5 when the high pressure water-liquid media chlorine dioxide solution is formed.

* * * * *